(12) United States Patent
Laaksonen et al.

(10) Patent No.: US 11,822,708 B2
(45) Date of Patent: Nov. 21, 2023

(54) METHODS, APPARATUS, SYSTEMS, COMPUTER PROGRAMS FOR ENABLING CONSUMPTION OF VIRTUAL CONTENT FOR MEDIATED REALITY

(71) Applicant: Nokia Technologies Oy, Espoo (FI)

(72) Inventors: Lasse Juhani Laaksonen, Tampere (FI); Miikka Vilermo, Siuro (FI); Mikko Tammi, Tampere (FI); Arto Lehtiniemi, Lempaala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 8 days.

(21) Appl. No.: 16/625,889

(22) PCT Filed: Jun. 13, 2018

(86) PCT No.: PCT/FI2018/050444
§ 371 (c)(1),
(2) Date: Dec. 23, 2019

(87) PCT Pub. No.: WO2019/002668
PCT Pub. Date: Jan. 3, 2019

(65) Prior Publication Data
US 2020/0150751 A1    May 14, 2020

(30) Foreign Application Priority Data
Jun. 30, 2017 (EP) ..................................... 17178897

(51) Int. Cl.
*G06F 1/03* (2006.01)
*H04N 13/332* (2018.01)
(Continued)

(52) U.S. Cl.
CPC ............... *G06F 3/011* (2013.01); *G06T 7/70* (2017.01); *G06T 11/00* (2013.01); *H04N 13/332* (2018.05); *H04R 5/02* (2013.01); *H04S 3/008* (2013.01); *H04S 7/304* (2013.01); *G10L 19/008* (2013.01); *H04S 2400/01* (2013.01); *H04S 2400/11* (2013.01)

(58) Field of Classification Search
CPC .......... G06F 3/011; H04N 13/332; G06T 7/70
See application file for complete search history.

(56) References Cited

U.S. PATENT DOCUMENTS

| | | |
|---|---|---|
| 8,831,255 B2 | 9/2014 | Crawford et al. |
| 2014/0375683 A1 | 12/2014 | Salter et al. |

(Continued)

OTHER PUBLICATIONS

"Sony's 'Joshua Bell VR Experience' on PSVR is Among the Best VR Video You'll Find on Any Headset", Road Tovr, Retrieved on Dec. 11, 2019, Webpage available at : https://www.roadtovr.com/now-psvr-sonys-joshua-bell-vr-experience-among-best-vr-video-youll-find-headset/.

(Continued)

*Primary Examiner* — Matthew Salvucci
(74) *Attorney, Agent, or Firm* — ALSTON & BIRD LLP

(57) ABSTRACT

A method comprising: in response to a determination that a user is not consuming or not fully consuming virtual content, rendering to the user, a real-time notification in response to real-time virtual content consumable by the user, wherein the real-time notification directs a user to adopt a particular orientation in the real space for starting or augmenting consumption, of the real-time virtual content.

12 Claims, 7 Drawing Sheets

(51) Int. Cl.
*G06T 7/70* (2017.01)
*G06F 3/01* (2006.01)
*G06T 11/00* (2006.01)
*H04R 5/02* (2006.01)
*H04S 3/00* (2006.01)
*H04S 7/00* (2006.01)
*G10L 19/008* (2013.01)

(56) References Cited

U.S. PATENT DOCUMENTS

2017/0026577 A1  1/2017  You et al.
2017/0123744 A1  5/2017  Park et al.
2018/0024799 A1  1/2018  Jarvenpaa et al.

OTHER PUBLICATIONS

Extended European Search Report received for corresponding European Patent Application No. 17178897.9, dated Aug. 23, 2017, 8 pages.
International Search Report and Written Opinion received for corresponding Patent Cooperation Treaty Application No. PCT/FI2018/050444, dated Jul. 12, 2018, 11 pages.
Office action received for corresponding European Patent Application No. 17178897.9, dated Nov. 13, 2020, 6 pages.
Summons to Attend Oral Proceedings for European Application No. 17178897.9 dated Sep. 17, 2021, 7 pp.
Minutes of the Oral Proceedings for European Application No. 17178897.9 dated Jun. 2, 2022, 14 pages.

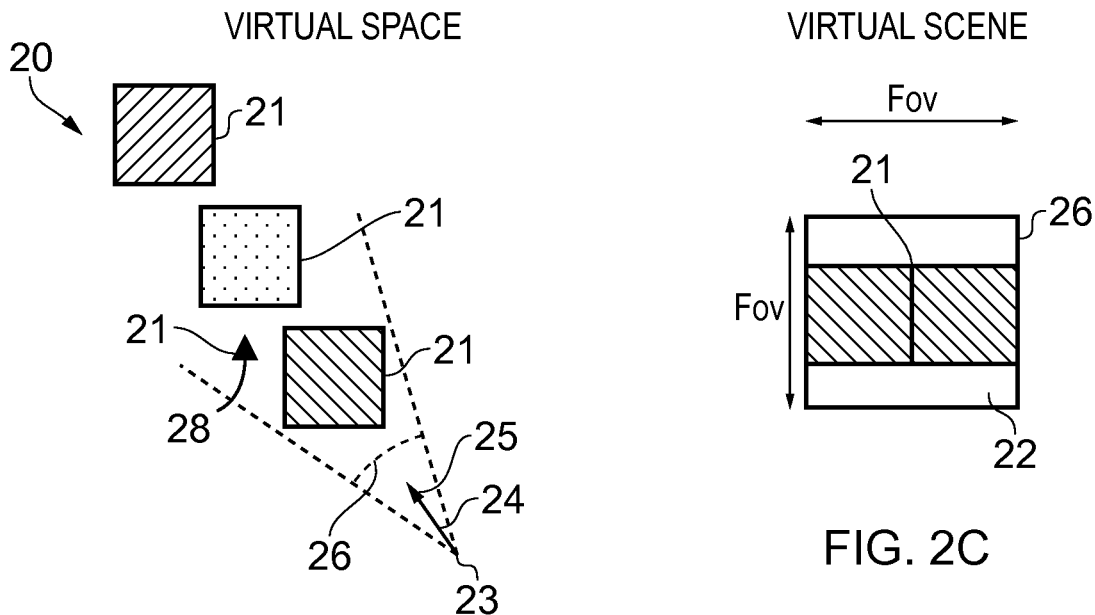
FIG. 1C
FIG. 2C
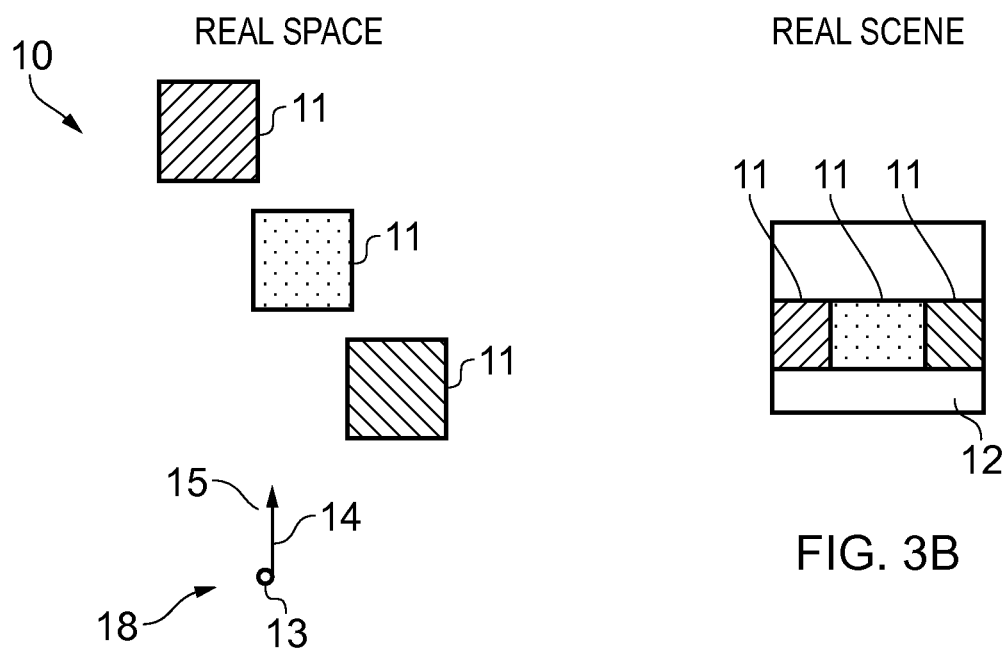
FIG. 3A
FIG. 3B

METHODS, APPARATUS, SYSTEMS, COMPUTER PROGRAMS FOR ENABLING CONSUMPTION OF VIRTUAL CONTENT FOR MEDIATED REALITY

RELATED APPLICATION

This application was originally filed as PCT Application No. PCT/FI2018/050444, filed on Jun. 13, 2018, which claims priority from EP Application No. 17178897.9, filed on Jun. 30, 2017.

TECHNOLOGICAL FIELD

Embodiments of the present invention relate to methods, apparatus, systems, computer programs for enabling consumption of virtual content for mediated reality.

BACKGROUND

"Mediated reality" describes when a user experiences a fully or partially artificial environment (a virtual space) as a virtual scene at least partially rendered by an apparatus to a user. The virtual scene is determined by a virtual position within the virtual space.

First person perspective-mediated reality is mediated reality in which the user's real position in a real space determines the virtual position within the virtual space.

In some implementations, the user's orientation in a physical space determines the virtual orientation within the virtual space but the user's location in the real space does not determine the virtual location within the virtual space.

In some implementations, the user's orientation in a physical space determines the virtual orientation within the virtual space and the user's location in the real space determines the virtual location within the virtual space.

If a user is to consume particular virtual content then they need to have, at the correct time, the correct real position in the real space that determines the correct virtual position within the virtual space.

BRIEF SUMMARY

According to various, but not necessarily all, embodiments of the invention there is provided a method comprising:

In response to a determination that a user is not consuming or not fully consuming virtual content, rendering to the user, a real-time notification in response to real-time virtual content consumable by the user, wherein the real-time notification directs a user to adopt a particular orientation in the real space for starting or augmenting consumption, of the real-time virtual content.

According to various, but not necessarily all, embodiments of the invention there is provided an apparatus comprising:

means for, in response to a determination that a user is not consuming or not fully consuming virtual content, rendering to the user, a real-time notification in response to real-time virtual content consumable by the user, wherein the real-time notification directs a user to adopt a particular orientation in the real space for starting or augmenting consumption, of the real-time virtual content.

According to various, but not necessarily all, embodiments of the invention there is provided an apparatus comprising:

at least one processor; and at least one memory including computer program code the at least one memory and the computer program code configured to, with the at least one processor, cause the apparatus 30 at least to perform:

in response to a determination that a user is not consuming or not fully consuming virtual content, rendering to the user, a real-time notification in response to real-time virtual content consumable by the user, wherein the real-time notification directs a user to adopt a particular orientation in the real space for starting or augmenting consumption, of the real-time virtual content.

According to various, but not necessarily all, embodiments of the invention there is provided examples as claimed in the appended claims.

BRIEF DESCRIPTION OF FIGURES

For a better understanding of various examples that are useful for understanding the brief description, reference will now be made by way of example only to the accompanying drawings in which:

FIGS. 1A-1C and 2A-2C illustrate examples of mediated reality in which FIGS. 1A, 1B, 1C illustrate, from a common top perspective, the same virtual visual space and different points of view and FIGS. 2A, 2B, 2C illustrate a virtual visual scene from the perspective of the respective points of view;

FIG. 3A illustrates an example of a real space and FIG. 3B illustrates an example of a real visual scene;

DEFINITIONS

Figure 1A:
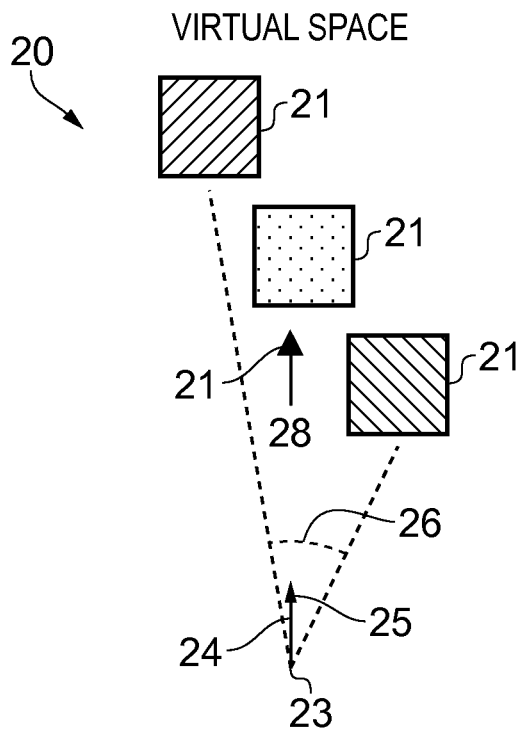

"artificial environment" may be something that has been recorded or generated.

"virtual visual space" refers to fully or partially artificial environment that may be viewed, which may be three dimensional.

"virtual visual scene" refers to a representation of the virtual visual space viewed from a particular point of view within the virtual visual space.

'virtual visual object' is a visible virtual object within a virtual visual scene.

"sound space" (or "virtual sound space") refers to an arrangement of sound sources in a three-dimensional space. A sound space may be defined in relation to recording sounds (a recorded sound space) and in relation to rendering sounds (a rendered sound space).

"sound scene" (or "virtual sound scene") refers to a representation of the sound space listened to from a particular point of view within the sound space.

"sound object" refers to sound source that may be located within the sound space. A source sound object represents a sound source within the sound space, in contrast to a sound source associated with an object in the virtual visual space. A recorded sound object represents sounds recorded at a particular microphone or position. A rendered sound object represents sounds rendered from a particular position.

"virtual space" may mean a virtual visual space, mean a sound space or mean a combination of a virtual visual space and corresponding sound space. In some examples, the virtual space may extend horizontally up to 360° and may extend vertically up to 180°.

"virtual scene" may mean a virtual visual scene, mean a sound scene or mean a combination of a virtual visual scene and corresponding sound scene.

'virtual object' is an object within a virtual scene, it may be an artificial virtual object (e.g. a computer-generated virtual object) or it may be an image of a real object in a real space that is live or recorded. It may be a sound object and/or a virtual visual object.

"Virtual position" is a position within a virtual space. It may be defined using a virtual location and/or a virtual orientation. It may be considered to be a movable 'point of view'.

"Correspondence" or "corresponding" when used in relation to a sound space and a virtual visual space means that the sound space and virtual visual space are time and space aligned, that is they are the same space at the same time.

"Correspondence" or "corresponding" when used in relation to a sound scene and a virtual visual scene (or visual scene) means that the sound space and virtual visual space (or visual scene) are corresponding and a notional listener whose point of view defines the sound scene and a notional viewer whose point of view defines the virtual visual scene (or visual scene) are at the same location and orientation, that is they have the same point of view (same virtual position).

"real space" (or "physical space") refers to a real environment, which may be three dimensional.

"real scene" refers to a representation of the real space from a particular point of view within the real space.

"real visual scene" refers to a representation of the real space viewed from a particular point of view within the real space.

"mediated reality" in this document refers to a user visually experiencing a fully or partially artificial environment (a virtual space) as a virtual scene at least partially rendered by an apparatus to a user. The virtual scene is determined by a point of view within the virtual space. Displaying the virtual scene means providing it in a form that can be perceived by the user.

"augmented reality" in this document refers to a form of mediated reality in which a user experiences a partially artificial environment (a virtual space) as a virtual scene comprising a real scene of a physical real world environment (real space) supplemented by one or more visual or audio elements rendered by an apparatus to a user;

"virtual reality" in this document refers to a form of mediated reality in which a user experiences a fully artificial environment (a virtual visual space) as a virtual scene displayed by an apparatus to a user;

"perspective-mediated" as applied to mediated reality, augmented reality or virtual reality means that user actions determine the point of view within the virtual space, changing the virtual scene;

"first person perspective-mediated" as applied to mediated reality, augmented reality or virtual reality means perspective mediated with the additional constraint that the user's real point of view (location and/or orientation) determines the point of view within the virtual space;

"third person perspective-mediated" as applied to mediated reality, augmented reality or virtual reality means perspective mediated with the additional constraint that the user's real point of view does not determine the point of view within the virtual space;

"user interactive" as applied to mediated reality, augmented reality or virtual reality means that user actions at least partially determine what happens within the virtual space;

"displaying" means providing in a form that is perceived visually (viewed) by the user.

"rendering" means providing in a form that is perceived by the user

DESCRIPTION

FIGS. 1A-1C and 2A-2C illustrate examples of mediated reality. The mediated reality may be augmented reality or virtual reality.

Figure 1B:
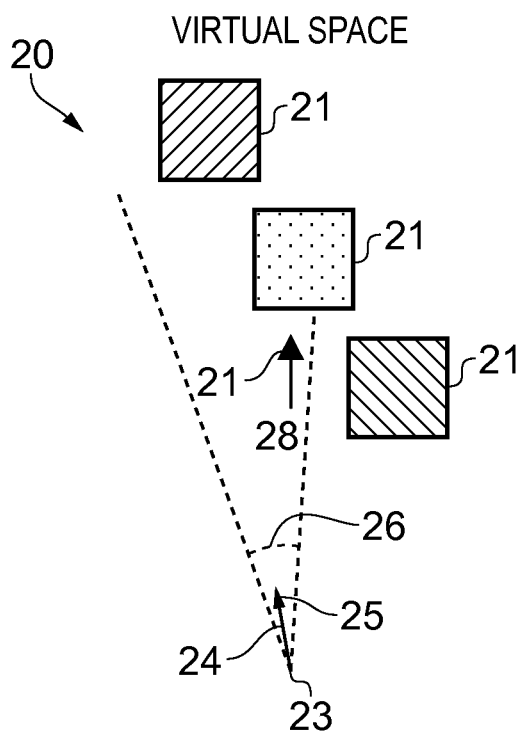

FIGS. 1A, 1B, 1C illustrate the same virtual visual space 20 comprising the same virtual visual objects 21, however, each Fig illustrates a different point of view 24. The location and direction of a point of view 24 can change independently. The direction but not the location of the point of view 24 changes from FIG. 1A to FIG. 1B. The direction and the location of the point of view 24 changes from FIG. 1B to FIG. 1C.

Figure 2A:
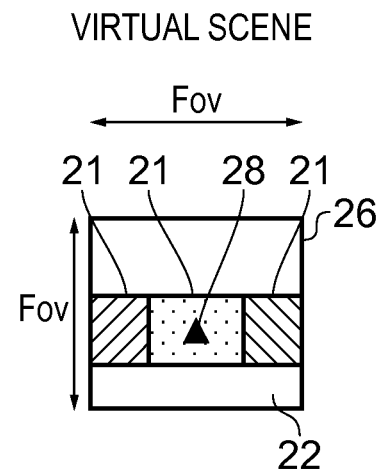
Figure 2B:
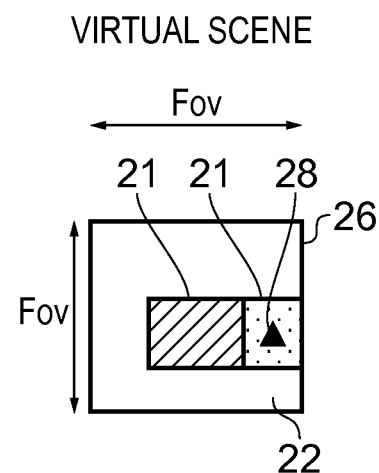

FIGS. 2A, 2B, 2C illustrate a virtual visual scene 22 from the perspective of the different points of view 24 of respective FIGS. 1A, 1B, 1C. The virtual visual scene 22 is determined by the point of view 24 within the virtual visual space 20 and a field of view 26. The virtual visual scene 22 is at least partially displayed to a user.

The virtual visual scenes 22 illustrated may be mediated reality scenes, virtual reality scenes or augmented reality scenes. A virtual reality scene displays a fully artificial virtual visual space 20. An augmented reality scene displays a partially artificial, partially real virtual visual space 20.

The mediated reality, augmented reality or virtual reality may be user interactive-mediated. In this case, user actions at least partially determine what happens within the virtual visual space 20. This may enable interaction with a virtual object 21 such as a visual element 28 within the virtual visual space 20. For example, a user may be able to select and move the virtual object 21.

The mediated reality, augmented reality or virtual reality may be perspective-mediated. In this case, user actions determine the point of view 24 within the virtual visual space 20, changing the virtual visual scene 22. For example, as illustrated in FIGS. 1A, 1B, 1C a location 23 of the point of view 24 within the virtual visual space 20 may be changed and/or a direction or orientation 25 of the point of view 24 within the virtual visual space 20 may be changed. If the virtual visual space 20 is three-dimensional, the location 23 of the point of view 24 has three degrees of freedom e.g. up/down, forward/back, left/right and the direction 25 of the point of view 24 within the virtual visual space 20 has three degrees of freedom e.g. roll, pitch, yaw. The point of view 24 may be continuously variable in location 23 and/or direction 25 and user action then changes the location and/or direction of the point of view 24 continuously. Alternatively, the point of view 24 may have discrete quantised locations 23 and/or discrete quantised directions 25 and user action switches by discretely jumping between the allowed locations 23 and/or directions 25 of the point of view 24.

FIG. 3A illustrates an example of a real space 10 comprising real objects 11 that partially corresponds with the virtual visual space 20 of FIG. 1A. In this example, each real object 11 in the real space 10 has a corresponding virtual object 21 in the virtual visual space 20, however, each virtual object 21 in the virtual visual space 20 does not have a corresponding real object 11 in the real space 10. In this example, one of the virtual objects 21, the computer-generated visual element 28, is an artificial virtual object 21 that does not have a corresponding real object 11 in the real space 10.

A linear mapping may exist between the real space 10 and the virtual visual space 20 and the same mapping exists between each real object 11 in the real space 10 and its corresponding virtual object 21. The relative relationship of the real objects 11 in the real space 10 is therefore the same as the relative relationship between the corresponding virtual objects 21 in the virtual visual space 20.

FIG. 3B illustrates an example of a real visual scene 12 that partially corresponds with the virtual visual scene 22 of FIG. 1A, it includes real objects 11 but not artificial virtual objects. The real visual scene is from a perspective corresponding to the point of view 24 in the virtual visual space 20 of FIG. 1A. The real visual scene content is determined by that corresponding point of view 24 and the field of view 26 in virtual space 20 (point of view 14 in real space 10).

FIG. 2A may be an illustration of an augmented reality version of the real visual scene 12 illustrated in FIG. 3B. The virtual visual scene 22 comprises the real visual scene 12 of the real space 10 supplemented by one or more visual elements 28 displayed by an apparatus to a user. The visual elements 28 may be a computer-generated visual element. In a see-through arrangement, the virtual visual scene 22 comprises the actual real visual scene 12 which is seen through a display of the supplemental visual element(s) 28. In a see-video arrangement, the virtual visual scene 22 comprises a displayed real visual scene 12 and displayed supplemental visual element(s) 28. The displayed real visual scene 12 may be based on an image from a single point of view 24 or on multiple images from different points of view at the same time, processed to generate an image from a single point of view 24.

In augmented reality, the virtual content 28 is one or more virtual objects 21. The virtual scene 22 comprises the real scene 12, augmented or not by virtual content in dependence upon the point of view 24 of the user 18.

In virtual reality, the virtual content 28 is the whole of the virtual scene and all virtual objects 21 within it. The virtual scene 22 comprises only the virtual content 28 determined in dependence upon the point of view 24 of the user 18.

Figure 4:
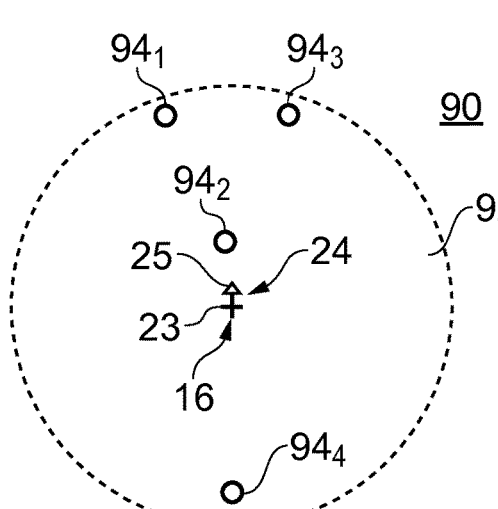
FIG. 4 illustrates, from a top perspective, an example of a sound space 90 that corresponds to the virtual visual space.

FIG. 4 illustrates, from a top perspective, an example of a sound space 90 that corresponds to the virtual visual space 20. FIG. 4 is a two-dimensional projection or cross-section of the three dimensional sound space 90. The sound space 90 defines a sound scene 92.

In some but not necessarily all examples, the virtual visual space 20 and the sound space 90 may be corresponding and form a combined virtual space 90,20. "Correspondence" or "corresponding" when used in relation to a sound space and a virtual visual space means that the sound space 90 and virtual visual space 20 are time and space aligned as combined virtual space 90,20, that is they are the same space at the same time.

The correspondence between virtual visual space 20 and sound space 90 results in correspondence between the virtual visual scene 22 and the sound scene 92 to form a combined virtual scene 92,22. "Correspondence" or "corresponding" when used in relation to a sound scene 92 and a virtual visual scene 22 means that the sound space 90 and virtual visual space 20 are corresponding and a notional listener whose point of view defines the sound scene 92 and a notional viewer whose point of view defines the virtual visual scene 22 are at the same location and orientation, that is they have the same point of view 24.

In FIG. 4, the sound space 90 and the virtual visual space 20 form a combined virtual space 90,20. The sound space 90 is an arrangement of sound sources 94 in a three-dimensional space. In this example, the sound space 90 is a rendered sound space.

The sound space 90 defines a sound scene 92 that corresponds to the virtual visual scene 22. The sound scene 92 and the virtual visual scene 22 form a combined virtual scene 92, 22. The sound scene 92 is a representation of the sound space 90 listened to from a particular point of view of a virtual listener (user) 16 within the sound space 90. The sound scene 92 is first person perspective-mediated. The user's real point of view determines the point of view within the sound space, changing the sound scene 92.

In this example, the point of view within the sound space 90 corresponds to the point of view 24 within the virtual visual space 20 and the same label is used. The virtual scene 92,22 is first person perspective-mediated. The user's real point of view determines the point of view 24 of the virtual user 16 within the combined virtual space 90, 20, changing the combined virtual scene 92, 22.

Correspondence in this sense means that there is a one-to-one mapping between the sound space 90 and the virtual visual space 20 such that a position in the sound space 90 has a corresponding position in the virtual visual space 20 and a position in the virtual visual space 20 has a corresponding position in the sound space 90. Correspondence in this sense means that there is a one-to-one mapping between the sound scene 92 and the virtual visual scene 22 such that a position in the sound scene 92 has a corresponding position in the virtual visual scene 22 and a position in the virtual visual scene 22 has a corresponding position in the sound scene 92

Corresponding also means that the coordinate system of the sound space 90/sound scene 92 and the coordinate system of the virtual visual space 20/virtual visual scene 22 are in register such that an object is positioned as a sound object in the sound scene and as a visual object in the visual scene at the same common position from the perspective of a virtual user 16.

In this illustrated example, the user actions determine the point of view 24 within the sound space 90 (and virtual visual space 20), changing the sound scene 92 and the virtual visual scene 22 simultaneously. For example, a location 23 of the point of view 24 within the virtual space 92, 20 may be changed and/or a direction or orientation 25 of the point of view 24 within the virtual space 92, 20 may be changed. If the virtual space 92, 20 is three-dimensional, the location 23 of the point of view 24 has three degrees of freedom e.g. up/down, forward/back, left/right and the direction 25 of the point of view 24 within the virtual visual space 20 has three degrees of freedom e.g. roll, pitch, yaw. The point of view 24 may be continuously variable in location 23 and/or direction 25 and user action then changes the location and/or direction of the point of view 24 continuously. Alternatively, the point of view 24 may have discrete quantised locations 23 and/or discrete quantised directions 25 and user action switches by discretely jumping between the allowed locations 23 and/or directions 25 of the point of view 24.

The functionality that enables control of a virtual visual space 20 and the virtual visual scene 26 dependent upon the virtual visual space 20 and the functionality that enables control of a sound space and the sound scene 92 dependent upon the sound space 90 may be provided by the same apparatus, system, method or computer program.

Sound and Vision

Figure 5:
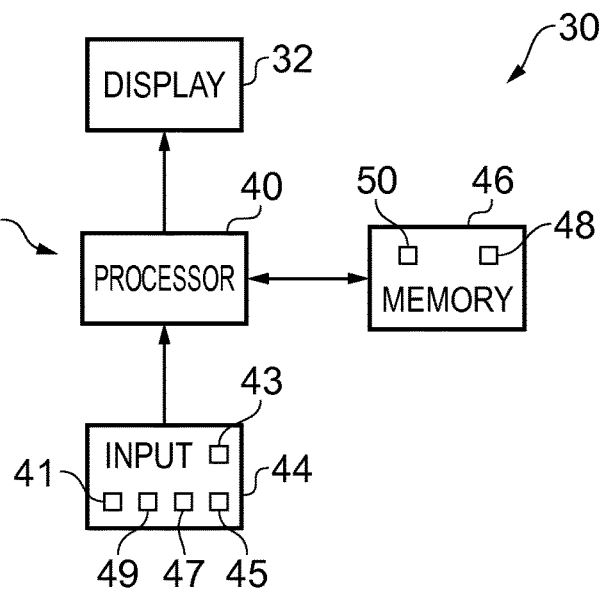
FIG. 5 illustrates an example of an apparatus that is operable to enable mediated reality and/or augmented reality and/or virtual reality.

FIG. 5 illustrates an example of an apparatus 30 that is operable to enable mediated reality and/or augmented reality and/or virtual reality.

The apparatus 30 comprises a rendering device or devices 32, which may render information to a user visually via a display, aurally via one or more audio outputs 32, for example via loudspeakers, and/or haptically via a haptic device.

The audio output device 32 may comprise one or more spatially distributed audio sources. For example, binaural loudspeakers may be separated in a head mounted audio (HMA) device, loudspeakers may be spatially separated in a sound bar or in a distributed loudspeaker arrangement e.g. 5.1 or 7.1 surround sound.

The display 32 is for providing at least parts of the virtual visual scene 22 to a user in a form that is perceived visually by the user. The display 32 may be a visual display that provides light that displays at least parts of the virtual visual scene 22 to a user. Examples of visual displays include liquid crystal displays, organic light emitting displays, emissive, reflective, transmissive and transflective displays, direct retina projection display, near eye displays etc. The display may be a head-mounted display (HMD), a hand-portable display or television display or some other display.

The rendering device or devices 32 are controlled in this example but not necessarily all examples by a controller 42.

Implementation of a controller 42 may be as controller circuitry. The controller 42 may be implemented in hardware alone, have certain aspects in software including firmware alone or can be a combination of hardware and software (including firmware).

As illustrated in FIG. 5 the controller 42 may comprise a processor 40 configured to load computer program instructions 48 from a memory 46. The controller 42 may be implemented using instructions that enable hardware functionality, for example, by using executable computer program instructions 48 in a general-purpose or special-purpose processor 40 that may be stored on a computer readable storage medium (disk, memory etc) to be executed by such a processor 40.

The processor 40 is configured to read from and write to the memory 46. The processor 40 may also comprise an output interface via which data and/or commands are output by the processor 40 and an input interface via which data and/or commands are input to the processor 40.

The memory 46 stores at least a computer program 48 comprising computer program instructions (computer program code) that controls the operation of the apparatus 30 when loaded into the processor 40. The computer program instructions, of the computer program 48, provide the logic and routines that enables the apparatus to perform at least the methods illustrated in FIGS. 6A & 6B. The processor 40 by reading the memory 46 is able to load and execute the computer program 48.

The apparatus 30 may enable user-interactive mediation for mediated reality and/or augmented reality and/or virtual reality. The input circuitry 44 detects user actions using user input 43. These user actions are used by the controller 42 to determine what happens within the virtual space. This may enable interaction with a visual element 28 within the virtual visual space 20.

The apparatus 30 may enable perspective mediation for mediated reality and/or augmented reality and/or virtual reality. The input circuitry 44 detects user actions. These user actions are used by the controller 42 to determine the point of view 24 within the virtual space, changing the virtual scene. The point of view 24 may be continuously variable in location and/or direction and user action changes the location and/or direction of the point of view 24. Alternatively, the point of view 24 may have discrete quantised locations and/or discrete quantised directions and user action switches by jumping to the next location and/or direction of the point of view 24.

The apparatus 30 may enable first person perspective for mediated reality, augmented reality or virtual reality. The input circuitry 44 detects the user's real point of view 14 using point of view sensor 45. The user's real point of view is used by the controller 42 to determine the point of view 24 within the virtual space, changing the virtual scene. Referring back to FIG. 3A, a user 18 has a real point of view 14. The real point of view may be changed by the user 18. For example, a real location 13 of the real point of view 14 is the location of the user 18 and can be changed by changing the physical location 13 of the user 18. For example, a real direction 15 of the real point of view 14 is the direction in which the user 18 is looking and can be changed by changing the real direction of the user 18. The real direction 15 may, for example, be changed by a user 18 changing an orientation of their head or view point and/or a user changing a direction of their gaze.

A head-mounted apparatus 30, may be used to enable first-person perspective mediation by measuring a change in location and/or a change in orientation of the user's head and/or a change in the user's direction of gaze. The head-mounted apparatus 30 may, for example, operate as a head mounted audio (HMA) device, a head mounted display (HMD) device or a combined head mounted display and audio (HMDA) device, In some but not necessarily all examples, the apparatus 30 comprises as part of the input circuitry 44 point of view sensors 45 for determining changes in the real point of view.

For example, positioning technology such as GPS, HAIP (high-accuracy indoor positioning) triangulation (trilateration) by transmitting to multiple receivers and/or receiving from multiple transmitters, acceleration detection and integration may be used to determine a new physical location 13 of the user 18 and real point of view 14.

For example, accelerometers, electronic gyroscopes or electronic compasses may be used to determine a change in an orientation of a user's head or view point and a consequential change in the real direction 15 of the real point of view 14.

For example, pupil tracking technology, based for example on computer vision, may be used to track movement of a user's eye or eyes and therefore determine a direction of a user's gaze and consequential changes in the real direction 15 of the real point of view 14.

The apparatus 30 may comprise as part of the input circuitry 44 image sensors 47 for imaging the real space 10.

An example of an image sensor 47 is a digital image sensor that is configured to operate as a camera. Such a camera may be operated to record static images and/or video images. In some, but not necessarily all embodiments, cameras may be configured in a stereoscopic or other spatially distributed arrangement so that the real space 10 is viewed from different perspectives. This may enable the creation of a three-dimensional image and/or processing to establish depth, for example, via the parallax effect.

In some, but not necessarily all embodiments, the input circuitry 44 comprises depth sensors 49. A depth sensor 49 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the real space 10 with structured light, preferably invisible light such as infrared light, with a spatially dependent pattern. Detection of a certain pattern by the receiver allows the real space 10 to be spatially resolved. The distance to the spatially resolved portion of the real space 10 may be determined by time of flight and/or stereoscopy (if the receiver is in a stereoscopic position relative to the transmitter).

In some but not necessarily all embodiments, the input circuitry 44 may comprise communication circuitry 41 in addition to or as an alternative to one or more of the image sensors 47 and the depth sensors 49. Such communication circuitry 41 may communicate with one or more remote image sensors 47 in the real space 10 and/or with remote depth sensors 49 in the real space 10.

Figure 6A:
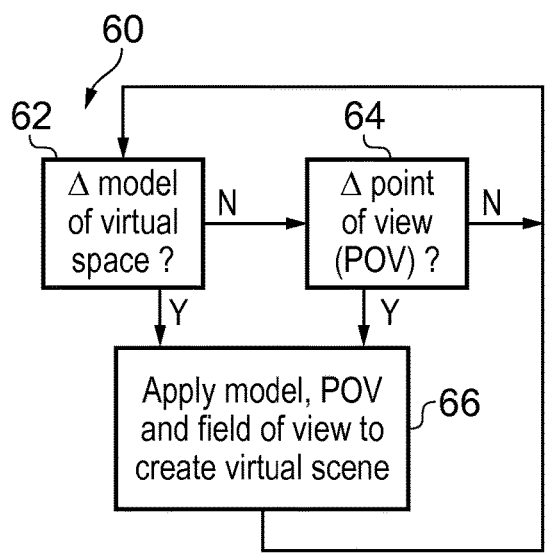
FIG. 6A illustrates an example of a method for enabling mediated reality and/or augmented reality and/or virtual reality.

The apparatus 30 may enable mediated reality and/or augmented reality and/or virtual reality, for example using the method 60 illustrated in FIG. 6A or a similar method. The controller 42 stores and maintains a model 50 of the virtual space 20 and a mapping between the physical space and the virtual space.

The model may be provided to the controller 42 or determined by the controller 42. For example, sensors in input circuitry 44 may optionally be used to create overlapping depth maps of the real space from different points of view, virtual content is added, to produce and change the model.

Each real location 13 in the physical space 10, through the mapping 30, has a corresponding virtual location 23 in the virtual space 20 and vice versa. Each real orientation 15 in the physical space 10, through the mapping 30, has a corresponding virtual orientation 25 in the virtual space 20 and vice versa.

There are many different technologies that may be used to create a depth map. An example of a passive system, used in the Kinect™ device, is when an object is painted with a non-homogenous pattern of symbols using infrared light and the reflected light is measured using multiple cameras and then processed, using the parallax effect, to determine a location of the object.

At block 62 it is determined whether or not the model of the virtual space 20 has changed. If the model of the virtual visual space 20 has changed the method moves to block 66. If the model of the virtual visual space 20 has not changed the method moves to block 64.

At block 64 it is determined whether or not the point of view 24 in the virtual visual space 20 has changed. If the point of view 24 has changed the method moves to block 66. If the point of view 24 has not changed the method returns to block 62.

At block 66, a two-dimensional projection of the three-dimensional virtual visual space 20 is taken from the location 23 and in the direction 25 defined by the current point of view 24. The projection is limited by the field of view 26 to produce the virtual visual scene 22. The projection may also define the sound scene. The method then returns to block 62.

Figure 6B:
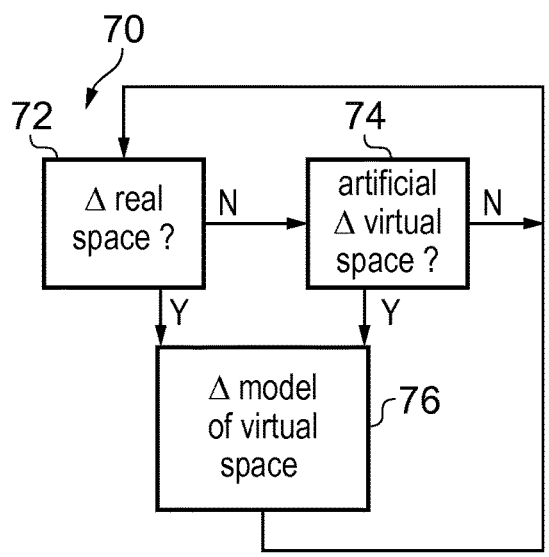
FIG. 6B illustrates an example of a method for updating a model of the virtual visual space for augmented reality.

FIG. 6B illustrates an example of a method 70 for updating a model of the virtual visual space 20 for augmented reality. Where the apparatus 30 enables augmented reality, the virtual visual space 20 comprises objects 11 from the real space 10 and also visual elements 28 not present in the real space 10. The combination of such visual elements 28 may be referred to as the artificial virtual visual space.

At block 72 it is determined whether or not the real space 10 has changed. If the real space 10 has changed the method moves to block 76. If the real space 10 has not changed the method moves to block 74. Detecting a change in the real space 10 may be achieved at a pixel level using differencing and may be achieved at an object level using computer vision to track objects as they move.

At block 74 it is determined whether or not the artificial virtual visual space has changed. If the artificial virtual visual space has changed the method moves to block 76. If the artificial virtual visual space has not changed the method returns to block 72. As the artificial virtual visual space is generated by the controller 42 changes to the visual elements 28 are easily detected.

At block 76, the model of the virtual visual space 20 is updated.

The blocks illustrated in the FIGS. 6A & 6B may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

Visual Rendering

Figure 7A:
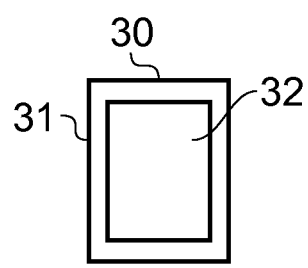
FIGS. 7A and 7B illustrate examples of apparatus that enable display of at least parts of the virtual visual scene to a user.
Figure 7B:
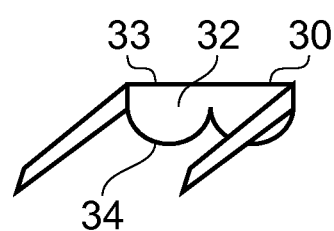

FIGS. 7A and 7B illustrate examples of apparatus 30 that enable display of at least parts of the virtual visual scene 22 to a user and rendering of audio to a user.

FIG. 7A illustrates a handheld apparatus 31 comprising a display screen as display 32 that displays images to a user and is used for displaying the virtual visual scene 22 to the user. The apparatus 30 may be moved deliberately in the hands of a user in one or more of the previously mentioned six degrees of freedom. The handheld apparatus 31 may house the sensors 45 for determining changes in the real point of view from a change in orientation of the apparatus 30. The handheld apparatus 31 may house the sensors 45 for determining changes in the real point of view from a change in a user controlled device such as, for example, actuation of buttons, virtual buttons, slider, joystick, etc. The handheld apparatus 31 may be or may be operated as a see-video arrangement for augmented reality that enables a live or recorded video of a real visual scene 12 to be displayed on the display 32 for viewing by the user while one or more visual elements 28 are simultaneously displayed on the display 32 for viewing by the user. The combination of the displayed real visual scene 12 and displayed one or more visual elements 28 provides the virtual visual scene 22 to the user.

If the handheld apparatus 31 has a camera mounted on a face opposite the display 32, it may be operated as a see-video arrangement that enables a live real visual scene 12 to be viewed while one or more visual elements 28 are displayed to the user to provide in combination the virtual visual scene 22.

FIG. 7B illustrates a head-mounted apparatus 33 comprising a display 32 and/or audio output 32 that renders content to a user. The head-mounted apparatus 33 may be moved automatically when a head of the user moves.

A head-mounted apparatus 33 comprising a display 32 may be referred to as a head-mounted display (HMD) device.

A head-mounted apparatus 33 comprising an audio output 32 (e.g. a loudspeaker) may be referred to as a head-mounted audio (HMA) device.

The head-mounted apparatus 33 may house the sensors 44 (not illustrated) for point of view detection that detect a location and orientation of the apparatus 33 or an orientation of the apparatus 33.

The head-mounted apparatus 33 may house the sensors 45 (not illustrated) for gaze direction detection and/or selection gesture detection.

The head-mounted apparatus 33 may be a see-through HMD arrangement for augmented reality that enables a live real visual scene 12 to be viewed while one or more visual elements 28 are displayed by the display 32 to the user to provide in combination the virtual visual scene 22. In this case a visor 34, if present, is transparent or semi-transparent so that the live real visual scene 12 can be viewed through the visor 34.

The head-mounted apparatus 33 may be operated as a see-video arrangement for augmented reality that enables a live or recorded video of a real visual scene 12 to be displayed by the display 32 for viewing by the user while one or more visual elements 28 are simultaneously displayed by the display 32 for viewing by the user. The combination of the displayed real visual scene 12 and displayed one or more visual elements 28 provides the virtual visual scene 22 to the user. In this case a visor 34 is opaque and may be used as display 32.

Referring back to FIG. 5, an apparatus 30 may enable user-interactive mediation for mediated reality and/or augmented reality and/or virtual reality. The input circuitry 44 detects user actions using user input 43. These user actions are used by the controller 42 to determine what happens within the virtual visual space 20. This may enable interaction with a visual element 28 within the virtual visual space 20.

The detected user actions may, for example, be gestures performed in the real space 10. Gestures may be detected in a number of ways. For example, depth sensors 49 may be used to detect movement of parts a user 18 and/or or image sensors 47 may be used to detect movement of parts of a user 18 and/or positional/movement sensors attached to a limb of a user 18 may be used to detect movement of the limb.

Object tracking may be used to determine when an object or user changes or moves. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, finger movement, facial movement. These are scene independent user (only) movements relative to the user.

The apparatus 30 may track a plurality of objects and/or points in relation to a user's body, for example one or more joints of the user's body. In some examples, the apparatus 30 may perform full body skeletal tracking of a user's body. In some examples, the apparatus 30 may perform digit tracking of a user's hand.

The tracking of one or more objects and/or points in relation to a user's body may be used by the apparatus 30 in action recognition.

Figure 8A:
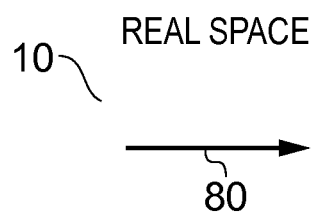
FIG. 8A, illustrates an example of a gesture in real space

Referring to FIG. 8A, a particular action 80 in the real space 10 is an action user input used as a 'user control' event by the controller 42 to determine what happens within the virtual visual space 20. An action user input is an action 80 that has meaning to the apparatus 30 as a user input.

Figure 8B:
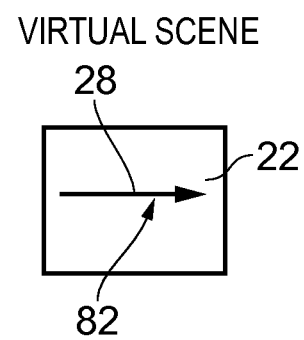
FIG. 8B, illustrates a corresponding representation rendered, in the virtual visual scene, of the gesture in real space.

Referring to FIG. 8B, illustrates that in some but not necessarily all examples, a corresponding representation of the action 80 in real space is rendered in the virtual visual scene 22 by the apparatus 30. The representation involves one or more visual elements 28 moving 82 to replicate or indicate the action 80 in the virtual visual scene 22.

An action 80 may be static or moving. A moving action may comprise a movement or a movement pattern comprising a series of movements. For example it could be making a circling motion or a side to side or up and down motion or the tracing of a sign in space. A moving action may, for example, be an apparatus-independent action or an apparatus-dependent action. A moving action may involve movement of a user input object e.g. a user body part or parts, or a further apparatus, relative to the sensors. The body part may comprise the user's hand or part of the user's hand such as one or more fingers and thumbs. In other examples, the user input object may comprise a different part of the body of the user such as their head or arm. Three-dimensional movement may comprise motion of the user input object in any of six degrees of freedom. The motion may comprise the user input object moving towards or away from the sensors as well as moving in a plane parallel to the sensors or any combination of such motion.

An action 80 may be a non-contact action. A non-contact action does not contact the sensors at any time during the action.

An action 80 may be an absolute action that is defined in terms of an absolute displacement from the sensors. Such an action may be tethered, in that it is performed at a precise location in the real space 10. Alternatively an action 80 may be a relative action that is defined in terms of relative displacement during the action. Such an action may be un-tethered, in that it need not be performed at a precise location in the real space 10 and may be performed at a large number of arbitrary locations.

An action 80 may be defined as evolution of displacement, of a tracked point relative to an origin, with time. It may, for example, be defined in terms of motion using time variable parameters such as displacement, velocity or using other kinematic parameters. An un-tethered action may be defined as evolution of relative displacement Δd with relative time Δt.

An action 80 may be performed in one spatial dimension (1D action), two spatial dimensions (2D action) or three spatial dimensions (3D action).

The action 80 may be a gesture.

Record/Modify Sound Objects

Figure 9:
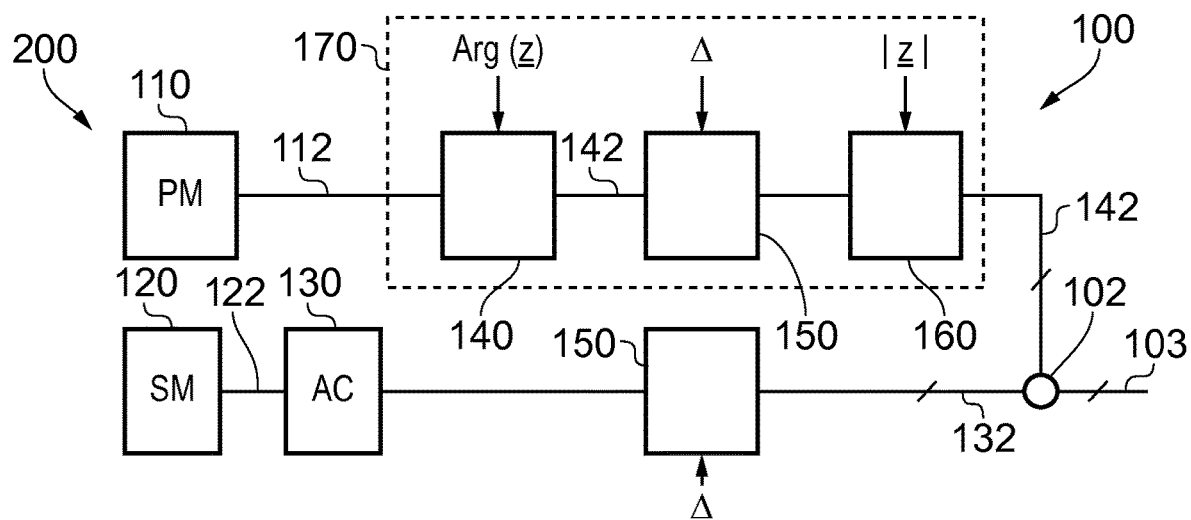
FIG. 9 illustrates an example of a system for modifying a rendered sound scene.

FIG. 9 illustrates an example of a system 100 and also an example of a method 200 for controlling rendering of a sound space for a notional listener at an arbitrary location (the origin) and orientation within the sound space at a particular location and/or orientation from the listener. A sound space is an arrangement of sound sources in a three-dimensional space. A sound space may be defined in relation to recording sounds (a recorded sound space) or in relation to rendering sounds (a rendered sound space).

The sound space may optionally comprise one or more portable sound objects 110 and/or may optionally comprise one or more static sound objects 120.

The relative location of a sound object from the origin may be represented by the vector z. The vector z therefore positions the sound object 110 relative to a notional listener of the recorded sound space.

The relative orientation of the notional listener at the origin may be represented by the value Δ. The orientation value Δ defines the notional listener's 'point of view' which defines the sound scene. The sound scene is a representation of the sound space listened to from a particular point of view within the sound space.

The audio signals 122 representing a static sound object 120 are, if necessary, coded by audio coder 130 into a multichannel audio signal 132. If multiple static sound objects are present, the audio signals 122 for each would be separately coded by an audio coder into a multichannel audio signal.

The audio coder 130 may be a spatial audio coder such that the multichannel audio signals 132 represent the sound space and can be rendered giving a spatial audio effect. For example, the audio coder 130 may be configured to produce multichannel audio signals 132 according to a defined standard such as, for example, binaural coding, 5.1 surround sound coding, 7.1 surround sound coding etc or to change coding from one format to another.

The multichannel audio signals 132 are mixed by mixer 102 with multichannel audio signals 142 representing one or more portable sound objects 110 to produce a multi-sound object multichannel audio signal 103 that represents the sound scene relative to the origin and which can be rendered by an audio decoder corresponding to the audio coder 130 to reproduce a sound scene to a listener that corresponds to the sound scene when the listener is at the origin.

The multichannel audio signal 142 for the, or each, portable sound object 110 is processed before mixing to take account of any movement of the portable sound object relative to the origin.

The audio signals 112 are processed by the positioning block 140 to adjust for movement of the portable sound object 110 relative to the origin. The positioning block 140 takes as an input the vector z or some parameter or parameters dependent upon the vector z. The vector z represents the relative location of the portable sound object 110 relative to the origin.

The positioning block 140 may be configured to adjust for any time misalignment between the audio signals 112 and the audio signals 122 so that they share a common time reference frame. This may be achieved, for example, by correlating naturally occurring or artificially introduced (non-audible) audio signals that are present within the audio signals 112 with those within the audio signals 122. Any timing offset identified by the correlation may be used to delay/advance the audio signals 112 before processing by the positioning block 140.

The positioning block 140 processes the audio signals 112, taking into account the relative orientation (Arg(z)) of that portable sound object relative to the origin.

The audio coding of the audio signals 122 to produce the multichannel audio signal 132 assumes a particular orientation of the rendered sound space relative to an orientation of the recorded sound space and the audio signals 122 are encoded to the multichannel audio signals 132 accordingly.

The relative orientation Arg (z) of the portable sound object 110 in the sound space is determined and the audio signals 112 representing the sound object are coded to the multichannels defined by the audio coding 130 such that the sound object is correctly oriented within the rendered sound space at a relative orientation Arg (z) from the listener. For example, the audio signals 112 may first be mixed or encoded into the multichannel signals 142 and then a transformation T may be used to rotate the multichannel audio signals 142, representing the moving sound object, within the space defined by those multiple channels by Arg (z).

An orientation block 150 may be used to rotate the multichannel audio signals 142 by A, if necessary. Similarly, an orientation block 150 may be used to rotate the multichannel audio signals 132 by A, if necessary.

The functionality of the orientation block 150 is very similar to the functionality of the orientation function of the positioning block 140 except it rotates by Δ instead of Arg(z).

In some situations, for example when the sound scene is rendered to a listener through a head-mounted audio output device 30, for example headphones using binaural audio coding, it may be desirable for a portion of the rendered sound space 90 to remain fixed in real space 10 when the listener turns their head in space. This means that the rendered sound space 90 needs to be rotated relative to the audio output device 30 by the same amount in the opposite sense to the head rotation. The orientation of the portion of the rendered sound space 90 tracks with the rotation of the listener's head so that the orientation of the rendered sound space 90 remains fixed in space and does not move with the listener's head.

The portable sound object signals 112 are additionally processed to control the perception of the distance D of the sound object from the listener in the rendered sound scene, for example, to match the distance |z| of the sound object from the origin in the recorded sound space. This can be useful when binaural coding is used so that the sound object is, for example, externalized from the user and appears to be at a distance rather than within the user's head, between the user's ears. The distance block 160 processes the multichannel audio signal 142 to modify the perception of distance.

Figure 10:
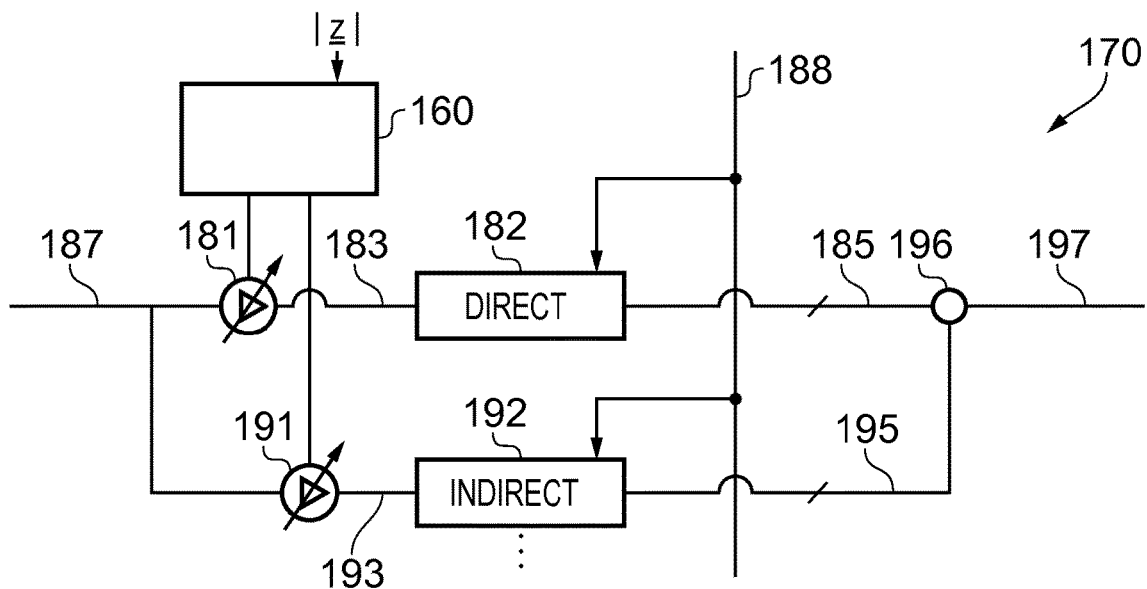
FIG. 10 illustrates an example of a module which may be used, for example, to perform the functions of the positioning block, orientation block and distance block of the system.

FIG. 10 illustrates a module 170 which may be used, for example, to perform the method 200 and/or functions of the positioning block 140, orientation block 150 and distance block 160 in FIG. 9. The module 170 may be implemented using circuitry and/or programmed processors.

The Figure illustrates the processing of a single channel of the multichannel audio signal 142 before it is mixed with the multichannel audio signal 132 to form the multi-sound object multichannel audio signal 103. A single input channel of the multichannel signal 142 is input as signal 187.

The input signal 187 passes in parallel through a "direct" path and one or more "indirect" paths before the outputs from the paths are mixed together, as multichannel signals, by mixer 196 to produce the output multichannel signal 197. The output multichannel signal 197, for each of the input channels, are mixed to form the multichannel audio signal 142 that is mixed with the multichannel audio signal 132.

The direct path represents audio signals that appear, to a listener, to have been received directly from an audio source and an indirect path represents audio signals that appear to a listener to have been received from an audio source via an indirect path such as a multipath or a reflected path or a refracted path.

The distance block 160 by modifying the relative gain between the direct path and the indirect paths, changes the perception of the distance D of the sound object from the listener in the rendered sound space 90.

Each of the parallel paths comprises a variable gain device 181, 191 which is controlled by the distance block 160.

The perception of distance can be controlled by controlling relative gain between the direct path and the indirect (decorrelated) paths. Increasing the indirect path gain relative to the direct path gain increases the perception of distance.

In the direct path, the input signal 187 is amplified by variable gain device 181, under the control of the distance block 160, to produce a gain-adjusted signal 183. The gain-adjusted signal 183 is processed by a direct processing module 182 to produce a direct multichannel audio signal 185.

In the indirect path, the input signal 187 is amplified by variable gain device 191, under the control of the distance block 160, to produce a gain-adjusted signal 193. The gain-adjusted signal 193 is processed by an indirect processing module 192 to produce an indirect multichannel audio signal 195.

The direct multichannel audio signal 185 and the one or more indirect multichannel audio signals 195 are mixed in the mixer 196 to produce the output multichannel audio signal 197.

The direct processing block 182 and the indirect processing block 192 both receive direction of arrival signals 188. The direction of arrival signal 188 gives the orientation Arg(z) of the portable sound object 110 (moving sound object) in the recorded sound space and the orientation Δ of the rendered sound space 90 relative to the notional listener/audio output device 300.

The location of the moving sound object changes as the portable object 110 moves in the recorded sound space and the orientation of the rendered sound space changes as a head-mounted audio output device rendering the sound space rotates.

The direct processing block 182 may, for example, include a system 184 that rotates the single channel audio signal, gain-adjusted input signal 183, in the appropriate multichannel space producing the direct multichannel audio signal 185. The system uses a transfer function to performs a transformation T that rotates multichannel signals within the space defined for those multiple channels by Arg(z) and by A, defined by the direction of arrival signal 188. For example, a head related transfer function (HRTF) interpolator may be used for binaural audio. As another example, Vector Base Amplitude Panning (VBAP) may be used for loudspeaker format (e.g. 5.1) audio.

The indirect processing block 192 may, for example, use the direction of arrival signal 188 to control the gain of the single channel audio signal, the gain-adjusted input signal 193, using a variable gain device 194. The amplified signal is then processed using a static decorrelator 196 and a static transformation T to produce the indirect multichannel audio signal 195. The static decorrelator in this example uses a pre-delay of at least 2 ms. The transformation T rotates multichannel signals within the space defined for those multiple channels in a manner similar to the direct system but by a fixed amount. For example, a static head related transfer function (HRTF) interpolator may be used for binaural audio.

It will therefore be appreciated that the module 170 can be used to process the portable sound object signals 112 and perform the functions of:

(i) changing the relative location (orientation Arg(z) and/or distance |z|) of a rendered sound object, from a listener in the rendered sound space and (ii) changing the orientation of the rendered sound space (including the rendered sound object located according to (i)).

It should also be appreciated that the module 170 may also be used for performing the function of the orientation block 150 only, when processing the audio signals 122. However, the direction of arrival signal will include only Δ and will not include Arg(z). In some but not necessarily all examples, gain of the variable gain devices 191 modifying the gain to the indirect paths may be put to zero and the gain of the variable gain device 181 for the direct path may be fixed. In this instance, the module 170 reduces to a system that rotates the recorded sound space to produce the rendered sound space according to a direction of arrival signal that includes only Δ and does not include Arg(z).

Notification

Figure 11:
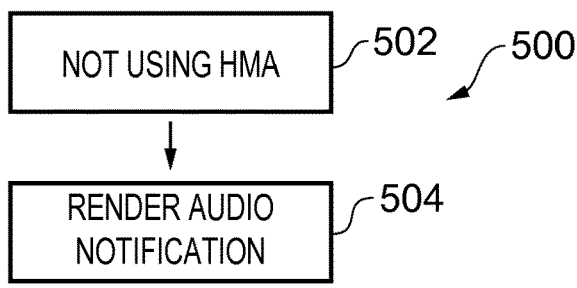
FIG. 11 illustrates an example of a method of controlling rendering of a real-time notification in response to real-time virtual content.
Figure 12A:
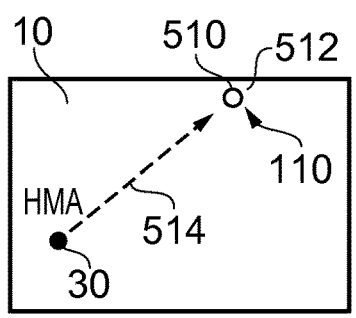
FIG. 12A illustrates an example of a real space in which the real-time notification is rendered and FIG. 12B illustrates an example of the virtual space 20, 90 defining the virtual content.

FIG. 11 illustrates an example of a method 500 for controlling rendering of a real-time notification 510 in response to real-time virtual content 28. FIG. 12A illustrates an example of a real space 10 in which the real-time notification 510 is rendered using a rendering device 32 (FIG. 13) and FIG. 12B illustrates an example of the virtual space 20, 90 defining the virtual content 28.

When the head-mounted apparatus 33 is in use by the user 18, the rendering of the mediated reality, for example, virtual reality or augmented reality, is as previously described. The user 18 wears the head-mounted apparatus 33 and as the user 18 changes their point of view 14 there is a corresponding change in the virtual point of view 24 and virtual content 28 rendered to the user 18.

The virtual content 28 may be time evolving so that it changes over time. While the user 18 is using the head-mounted apparatus 33, the user 18 is aware of the changing virtual content 28. However, a user 18 may not wish to permanently use the head-mounted apparatus 33 or not wish to consume all or some of the virtual content 28, and may wish to start or augment consumption of the virtual content 28 when a particular event occurs within the virtual content. For example, a user may wish to remove the head-mounted apparatus 33, switch-off visual and/or audio rendering of virtual content 28, or leave a defined portion 10' of the real space 10 in which virtual content 28 can be consumed (see FIG. 14) to perform some other task but not wish to miss relevant virtual content 28 while they have removed the head-mounted apparatus 33, have switched-off some or all of the virtual content 28 or have left the defined portion 10' of the real space 10.

Figure 12B:
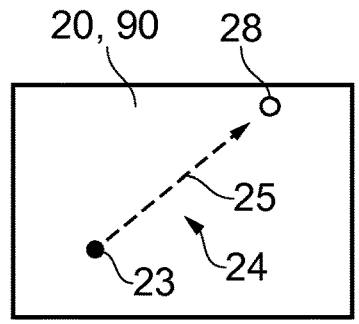

The method 500 and the FIGS. 12A and 12B illustrate the process that occurs when a user is not consuming or not fully consuming virtual content 28

The method 500 enables the rendering of a real-time notification 510 in response to real-time virtual content 28 that is consumable by the user 18. The real-time notification 510 directs a user 18 to adopt a particular orientation 15 in the real space 10 for starting or augmenting consumption, of the real-time virtual content 28.

The user may, for example, not be consuming virtual audio content, and may or may not be consuming virtual visual content. The notification 510 may enable the user to start consuming virtual audio content in addition to virtual visual content (augmenting the consumed virtual visual content). The notification 510 may enable the user to start consuming virtual audio content without consuming virtual visual content. The notification 510 may enable the user to start consuming both virtual audio content and virtual visual content.

The user may, for example, not be consuming virtual visual content, and may or may not be consuming virtual audio content. The notification 510 may enable the user to start consuming virtual visual content in addition to virtual audio content (augmenting the consumed virtual audio content). The notification 510 may enable the user to start consuming virtual visual content without consuming virtual audio content. The notification 510 may enable the user to start consuming both virtual audio content and virtual visual content.

The method 500 comprises, at block 502, detecting that the user 18 is not consuming or not fully consuming virtual content 28.

In response to a determination that a user is not consuming or not fully consuming virtual content, the method moves to block 504.

The method 500 comprises, at block 504, rendering to the user 18 not consuming or not fully consuming virtual content 28, a real-time notification 510 in response to real-time virtual content 28 consumable by the user 18, wherein the real-time notification 510 directs a user 18 to adopt a particular orientation 15 in the real space 10 for starting or augmenting consumption, of the real-time virtual content 28.

The real-time notification 510 directs a user to adopt a particular orientation 15 in the real space 10 when starting or augmenting consumption of the real-time virtual content 28.

In some, but not necessarily all examples, the virtual content is or comprises virtual visual content. In this situation, the method 500 comprises, at block 502, determining that a user 18 is not consuming the virtual visual content 28. Then the method 500 comprises at block 504, in response to the determination that a user 18 is not consuming the virtual visual content 28, rendering to the user 18 not consuming the virtual visual content 28, the real-time notification 510 in response to real-time virtual visual content 28 consumable by the user 18. The real-time notification 510 directs the user 18 to adopt a particular orientation 15 in the real space 10 for starting consumption of the real-time virtual visual content 28.

In the preceding descriptions of FIG. 11, it has been described that the real-time notification 510 directs a user 18 to adopt a particular orientation 15 in the real space 10 for starting or augmenting consumption, of the real-time virtual content 28. However, the real-time notification 510 may, in addition, direct a user 18 to adopt a particular location in the real space 10 for starting or augmenting consumption, of the real-time virtual content 28.

The method 500 may be performed by the apparatus 30, for example as previously described in relation to FIG. 5, 6A or 6B, the controller 42 of the apparatus 30 or the computer program 48. The apparatus 30 may a self-contained apparatus that performs all necessary functions itself or may be part of a system and delegate certain functions to other apparatuses or services.

In some but not necessarily all examples, when the user 18 starts or augments consumption of the real-time virtual content 28, the user 18 may do so via a primary apparatus designed for immersive virtual content consumption such as a head-mounted apparatus 33, or via a secondary apparatus that is not a primary apparatus and is, for example, not head-mounted. The secondary apparatus may, for example be a handheld apparatus 31 or one of a plurality of spatially distributed rendering devices 32.

In the preceding descriptions of FIG. 11, it has been described that the real-time notification 510 directs a user 18 to adopt a particular orientation 15 in the real space 10 for starting or augmenting consumption, of the real-time virtual content 28. For example, in some but not necessarily all examples, the real-time notification directs a user to adopt a particular orientation in the real space for starting consumption, when using a secondary apparatus 31 of the real-time virtual content 28. The orientation of the user for consumption may be the physical orientation of the user, for example, when using for consumption a head-mounted apparatus or a particular one of a plurality of spatially distributed rendering devices or, if different, if may be the orientation of the apparatus used. The orientation of the apparatus used may be different that a physical orientation of the user in some uses of a handheld apparatus for consumption.

In this situation, the method 500 comprises at block 504, in response to a determination that a user is not using a primary apparatus 33 for consumption of virtual content 28, rendering to the user 18 not using the primary apparatus 33, a real-time notification 510 in response to real-time virtual content 28 consumable by the user 18 when using the primary apparatus 33 in a real space, wherein the real-time notification 510 directs the user 18 to adopt a particular orientation 15 in the real space 10 for starting consumption, when using a secondary apparatus 33, of the real-time virtual content 28.

In some but not necessarily all examples, the primary apparatus 33 is a head-mounted apparatus, for example, a head-mounted display device when the virtual content 28 comprises virtual visual content. In some but not necessarily all examples or all of these examples, the secondary apparatus is a handheld apparatus 31.

In some but not necessarily all examples, it is determined that the user 18 is not consuming or not fully consuming virtual content 28 by determining that the user 18 is not using the head-mounted apparatus 33.

If the user 18 adopts the particular orientation in the real space, within a time threshold after the rendering of the real-time notification 510, the real-time virtual content 28 is automatically rendered to the user 18.

Figure 16A:
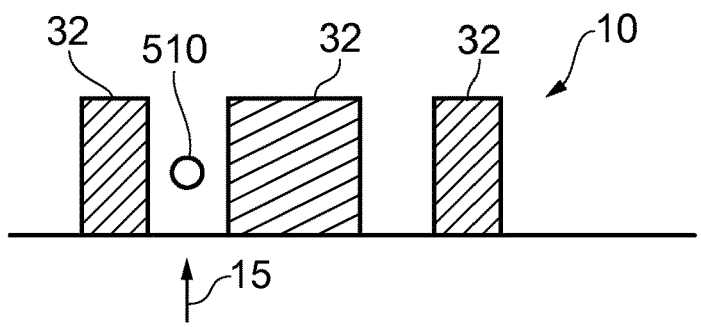
FIGS. 16A to 16D illustrate consumption of virtual visual content using a handheld apparatus at a particular orientation indicated by a notification.

FIG. 16A schematically illustrates a real-time notification 510 generated by rendering devices 32 at the particular orientation 15 in the real space 10.

Figure 16B:
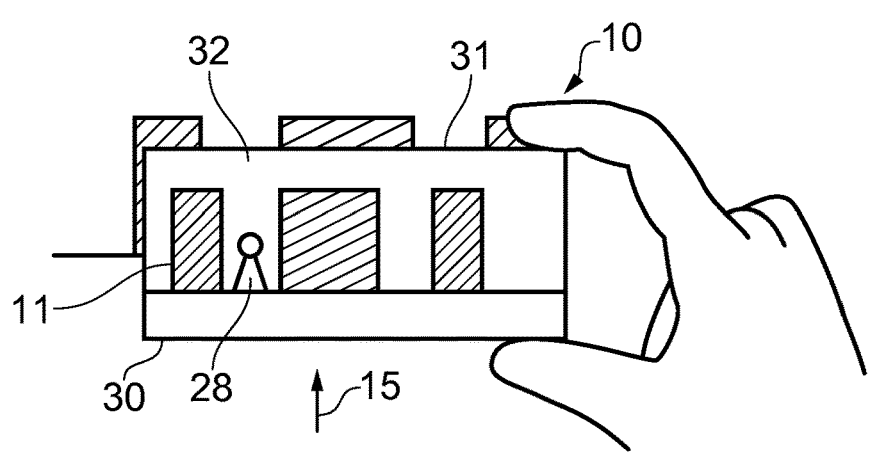
Figure 16C:
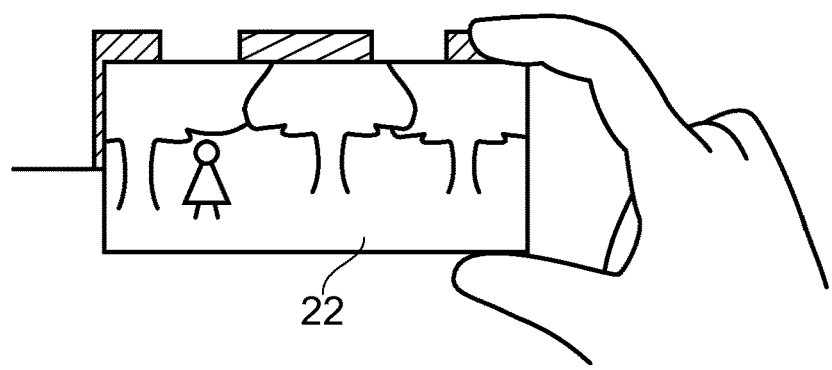

In FIG. 16B, the user adopts the particular orientation 15 in the real space 10 by holding a handheld apparatus 31 so that it captures images 11 from the particular orientation 15 in the real space 10, within a time threshold after the rendering of the real-time notification 510.

The fact that the user adopted the particular orientation 15 in the real space 10 in time is acknowledged by rendering a portion of virtual visual content 28 as augmented reality over the image 11 of the real scene 12.

The method 500 then automatically causes automatic rendering of virtual visual content 28 representing a virtual scene 22 to the user 18 via the handheld apparatus 31. Rendering of the virtual visual content 28 representing the virtual visual scene 22 to the user 18 via the handheld apparatus 31 does not occur automatically unless and until the user 18 adopts the particular orientation 15 in the real space 10 by holding the handheld apparatus 31 so that it captures images 11 from the particular orientation in the real space 10, within the time threshold after the start or end of rendering of the real-time notification 510.

Figure 16D:
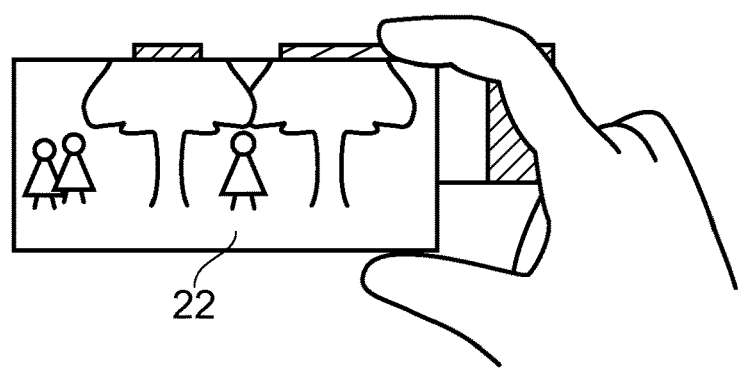

FIG. 16D illustrates that the virtual scene 22 may then be changed by changing the point of view 14 of the handheld apparatus 31 via first-person perspective mediated reality.

In some but not necessarily all examples, rendering of the virtual visual content 28 to the user 18 via the secondary device 31 e.g. the handheld apparatus ceases automatically if the use starts consumption of the virtual visual content via the primary apparatus e.g. the head-mounted apparatus 33.

It is therefore possible for the method 500 to produce multiple contemporaneous or simultaneous notifications 510, and for the user to select a particular notification 510 by adopting the particular orientation in the real space at which that notification 510 is rendered.

FIG. 12A illustrates an example of a real space 10 in which a real-time notification 510 is rendered, for example using one or more rendering devices 32 as previously described but not illustrated in FIG. 12A. The real-time notification 510 is rendered to the user 18 (not illustrated in FIG. 12A) who is not consuming or not fully consuming virtual content 28.

FIG. 12B illustrates the virtual content 28 defining the virtual space 20, 90. At the point in time illustrated in FIGS. 12A and 12B, the virtual content 28 is such that it triggers the generation of a real-time notification 510 as illustrated in FIG. 12A. The virtual content 28 that triggers the generation of the real-time notification 510 is consumable by the user 18 but is not being consumed or not being fully consumed by the user. The real-time notification 510, as illustrated in FIG. 12A directs a user 18 to adopt a particular orientation 15 in the real space 10 for starting or augmenting consumption of the real-time virtual content 28.

The particular orientation 15 is variable and depends upon the virtual content 28. The intention is that the user 18, when they start to use an apparatus 30 to start or augment consumption of the virtual content, knows in which direction to orient themselves and the apparatus 30 to consume the relevant virtual content 28.

As previously described the virtual content 28 consumable by a user 18 represents a virtual space 20, 90 at a virtual point of view 24 of a notional viewer/listener and that part of the virtual space 20, 90 at the virtual point of view 24 of the notional viewer/listener represented by the virtual content 28 depends upon a mapping between the real space 10 and the virtual space 20, 90 and the real point of view 14 of the apparatus 30 in the real space.

In some but not necessarily all examples, the mapping is constant and does not change while the virtual content 28 is time-evolving. In other examples, the mapping is optionally changed before rendering the real-time notification 510.

In order to render a notification 510 at the particular orientation 15 in the real space 10, it may be necessary to change the mapping so that the rendering devices 32 are configured to render the notification 510 at the particular orientation 15 in the real space 10. This may be controlled manually or automatically. For example, a user may move windows for displaying virtual visual content 28 within the virtual space 20 so that the windows are aligned with locations in the virtual space 20 that have corresponding locations in the real space 10 at which notifications 510 can be rendered. In some but not necessarily all example, the apparatus 30 may suggest suitable locations for the windows or automatically move the windows.

The real-time notification 510, in this example, is a spatial notification generated at a particular location 512. The location 512, in the real space 10 is at an orientation 514 that depends upon the mapping between the real space 10 and the virtual space 20,90 and a virtual point of view 24 defining the virtual content 28 in the virtual space 20,90.

The virtual content 28 is time-evolving while the user 18 is not consuming or not fully consuming virtual content 28. The virtual content therefore has its own evolving time reference. This time reference continues to evolve when the user 18 is not consuming or not fully consuming virtual content 28, that is, the time reference is not paused. Virtual content 28 is therefore missed because the user 18 is not consuming or not fully consuming virtual content 28. The reference to "real-time" virtual content 28 refers to content that is rendered or renderable at that time according to the time reference of the virtual space, that is, it is live. The reference to "real-time" in relation to the notification indicates that the notification 510 is rendered immediately with reference to the virtual space time.

In some embodiments, the rendering of the real-time notification 510 does not have any impact on the evolution of the time reference in the virtual space 20, 90. In other examples, the real-time notification 510 may cause a pause in the time evolution of the time reference of the virtual space 20, 90 so that the user 18 can respond to the notification 510 and catch up with the rendered virtual content 28.

The virtual content 28 that triggers the real-time notification 510 could be consumed by the user 18 if they were using the apparatus 30.

The purpose of the real-time notification 510 is to draw the user's attention to the existence of relevant virtual content 28 that could be consumed if the user 18 were to start using the apparatus 30. In particular, it orients the user 18 with respect to the virtual space 20,90 so that the user 18 may be correctly oriented in the real space 10 to consume the relevant virtual content when they start to use the apparatus 30.

In some, but not necessarily all, examples, the real-time notification 510 is rendered via a handheld apparatus 31 or one of a plurality of spatially distributed rendering devices 32 but is not provided by a head-mounted apparatus 33.

The real-time notification 510 may be a visual-only notification, or it may be an audio-only notification or it may be an audiovisual notification.

A visual notification, whether a visual only notification or an audiovisual notification, may be rendered by using one or more available spatially distributed visual rendering devices 32 or by using spatially distributed lights or an array of lights. The spatially distributed visual rendering devices 32 may be connected devices or controlled using a connected device. The notification 510 may be rendered using lights by adapting the hue and/or brightness of one or more lights. A light may be a device that radiates visible light and, in some examples, may be a lighting fixture designed to radiate visible light as its primary or one of its primary purposes.

In some, but not necessarily all, examples, the real-time notification 510 may comprise information in addition to that required to draw the user's attention to a particular direction of orientation. For example, the real-time notification 510 may present information to the user 18 that identifies to the user 18 the virtual content 28 that would be consumable if they were to use the apparatus 30 while oriented towards the direction of the real-time notification 510. The real-time notification 510 may, for example, be a portion of a soundtrack or video for the virtual content 28 or may be generated from metadata associated with the virtual content 28 or describe or depend upon a detected event in the virtual content 28 that causes the generation of the real-time notification 510.

The real-time notification 510 may be generated as a sound object 110. The sound object 110 may be generated using a head-mounted audio device, separate to the head-mounted apparatus. The head-mounted audio device is used by the user 18 whereas the head-mounted apparatus, for example the head-mounted display device, is not being used by the user 18. In some examples, the head-mounted audio device and the head-mounted display device may be separate apparatus. In other examples, the head-mounted audio device and the head-mounted display device may be provided by the same apparatus. In this latter case, it may be possible to use the head-mounted audio device without using the head-mounted display device as well as being possible to use both the head-mounted audio device and the head-mounted display device simultaneously.

Alternatively, the sound object 110 is generated by broadcasting audio from spatially distributed rendering devices 32 (loudspeakers).

Figure 13:
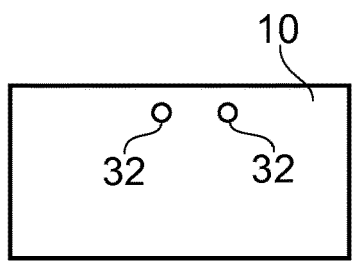
FIG. 13 illustrates an example of rendering devices that are used to render the real-time notification.

FIG. 13 illustrates an example of rendering devices 32 (audio output devices) that are used to render the real-time notification 510.

The rendering devices 32 may be dedicated to audio output (e.g. surround sound loudspeakers) and/or may be capable of audio output (e.g. loudspeakers of a mobile phone, television, etc). The number and distribution of rendering devices 32 may be controlled by selecting a sub-set of available rendering devices 32 for use.

These spatially distributed rendering devices 32, when audio output devices, may generate the sound object 110 representing the notification 510 by broadcasting audio. The rendering of sound objects 110 using spatially distributed audio output devices 32 has been described in detail previously and will not be described in this section.

The vector z defining a location at which to generate the sound object 110 is determined by the virtual orientation 25 required for the virtual content 28 (see FIG. 12B), and the location of the head-mounted apparatus 33 in the real space 10 by projecting the vector from the location along the virtual orientation 25 to define the real orientation 514 for the notification 510 (see FIG. 12A). The spatially distributed audio output devices 32 may then be controlled to produce the sound object 110 at the determined location.

In some examples, the real orientation 514 may be determined from the location of the head-mounted apparatus 33 as described in the preceding paragraph. However, in other examples it may be determined from another location such as, for example, a fixed location within the real space 10 or the location of the user 18.

For example, in some circumstances, the user 18 may not be located with the head-mounted apparatus 33 and in such circumstances the notification 510 represented by the sound object 110 may be generated at a position relative to the user 18. The position of the sound object 110 may track or vary as the user 18 changes location.

One objective is however that when the user 18 starts to use the apparatus 30 for starting or augmenting consumption of virtual content they are aware, from the notification 510, of what direction to orient themselves (orient the handheld apparatus 31) in real space 10 to consume the appropriate virtual content 28.

Another objective may be to simply indicate the direction of the triggering content (which may be meaningful for the user based on the previously consumed content).

An example of distributed audio devices 32 include, for example, a sound bar, or a spatially distributed arrangement of loudspeakers e.g. according to the 5.1 or 7.1 surround sound format or loudspeakers associated with the head-mounted apparatus 33.

The spatially distributed audio output devices 32 generate a sound field representing the sound object 110.

In one example, but not necessarily all examples, the head-mounted apparatus 33 may operate as the distributed audio devices 32. In one example, the internal loudspeakers that are normally used to produce audio signals adjacent the user's ears are used, instead, to broadcast audio signals into the real space 10. It may, in this circumstance, be necessary to override any safety limits in relation to the power output of those loudspeakers.

In another example, the head-mounted apparatus 33 may comprise additional external loudspeakers 32 that are configured to produce a sound field in the real space 10 to render the real-time notification 510 at the appropriate location.

In some circumstances, it may be necessary or desirable to perform a calibration process to ensure that the spatially distributed audio devices 32 can render notifications 510 at the required locations. Where the head-mounted apparatus 33 is used to produce the real-time notification 510 by broadcasting audio into the real space 10, it is necessary to properly account for the transfer function from the head-mounted apparatus 33 to the eardrum of the user 18. This will depend upon the position of the user 18 and also the position of the loudspeakers, that is the location and orientation of the head-mounted apparatus 33. If echoes or reverberations from the real space 10 are also used in the creation of the sound object 110 representing the notification 510 then the arrangement of the real space 10 will also impact upon the transfer function. In such circumstances, it may therefore be necessary, or desirable, to implement the calibration process that enables the correct location of the sound object 110 for different orientations of the head-mounted apparatus 33, and also for different relative displacements between the head-mounted apparatus 33 and the user 18.

Figure 14:
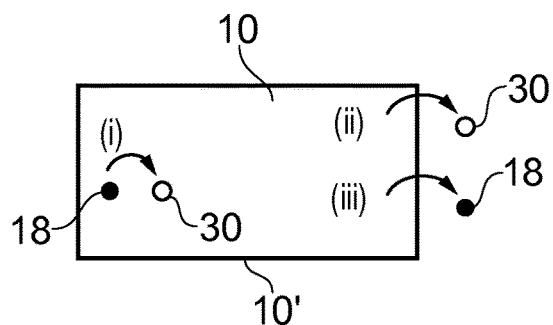
FIG. 14 illustrates an example of detecting when the user is not consuming or not fully consuming virtual content 28.

FIG. 14 illustrates an example of detecting when the user 18 is not consuming or not fully consuming virtual content 28. In some circumstances, this may be detected because the user 18 has performed the user action that indicates that they are no longer consuming the virtual content 28 which switches off the rendering of the virtual content 28 to them. In other circumstances, it may be necessary to infer that the user 18 is no longer using the head-mounted apparatus 33. Such inference may be determined, for example, as illustrated in FIG. 14.

Referring to FIG. 14, it may be determined that the user 18 is no longer or not consuming or not fully consuming virtual content 28, when:

i) the user 18 removes the head-mounted apparatus 33.

ii) the head-mounted apparatus is outside a defined portion 10' of the real space 10 used for rendering virtual content (iii) the user 18 is outside the defined portion 10' of the real space 10 used for rendering virtual content 28.

It may be determined that the user 18 has removed the head-mounted apparatus 33, for example, by: detecting an unusual orientation of the head-mounted apparatus 33, detecting that the head-mounted apparatus 33 has not moved for a period of time exceeding a threshold period of time, detecting a change in the relative locations of the head-mounted apparatus 33 and the user 18, detecting that there is no longer a head in proximity to the head-mounted apparatus 33.

It may be determined that the head-mounted apparatus is outside a defined portion 10' of the real space 10, for example, by tracking the location of the head-mounted apparatus relative to the defined portion 10' of the real space 10.

It may be determined that the user 18 is outside a defined portion 10' of the real space 10, for example, by tracking the location of the user 18 either directly or indirectly. Indirect tracking may, for example, occur by determining that the user 18 has not removed the head-mounted apparatus 33 using proximity detection and determining that the head-mounted apparatus 33 is outside the defined portion 10'.

The orientation 15 of the head-mounted apparatus 33, and the location 13 of the head-mounted apparatus 33, may be monitored over time using point of view sensors 45 as previously described.

A proximity detection device 43 may be used to monitor over time proximity of a user's head at the head-mounted apparatus 33. The proximity detection device 43 may for example use a capacitance sensor to detect the presence of a human head adjacent the head-mounted apparatus 33. It may, in some circumstances, also be possible to determine proximity using gaze detection. The prolonged absence of a pupil would indicate that the head-mounted apparatus is no longer being used.

As previously described the location of the user 18 may be tracked using the image sensor 47 or the depth sensor 49 or by some other system or method.

Thus, in some, but not necessarily all, examples, it may be determined that the user 18 is not consuming or not fully consuming virtual content 28 by detecting the orientation 15 and/or location 13 of the head-mounted apparatus or by detecting how the orientation 15 and/or the location 13 of the head-mounted apparatus changes over time.

Figure 15:
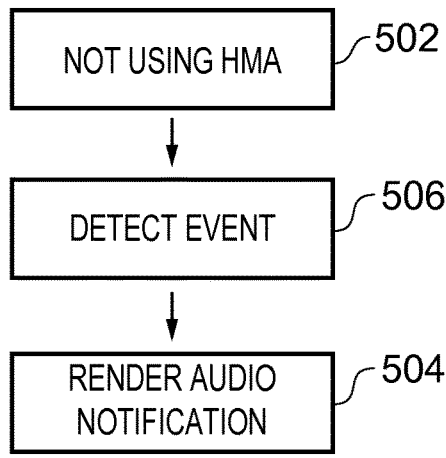
FIG. 15 illustrates a further example of the method that requires an event to trigger rendering of the notification.

FIG. 15 illustrates a further example of the method 500 illustrated in FIG. 11. This method 500 is the same as that illustrated in FIG. 11 in that the blocks 502 and 504 are the same. However, the method 500 of FIG. 15 additionally comprises a block 506 between block 502 and block 504. This is a conditional block that triggers the rendering of the notification 510. There are therefore two conditions for the rendering of the notification 510—that the user 18 is not consuming or not fully consuming virtual content 28 as required by block 502 and, in addition, that an event has been detected as required by block 506.

The block 506 allows the method to proceed to block 504 to render the notification 510 when an event in the virtual content 28 has been detected.

The location of the sound object 110 representing the notification 510 is at a location determined by the location of the event within the virtual content 28. The real-time notification 510 directs the user 18 to adopt a particular orientation 15 in the real space 10 for starting or augmenting consumption of the real-time virtual content 28 so that they can consume virtual content 28 associated with the detected event.

In some, but not necessarily all, examples, the user 18 may program the criteria used to detect an event and trigger the notification 510. For example, the user 18 may program that a notification 510 should be generated in response to a particular visual event or a particular audio event which may be detected using for example computer vision processing of the virtual visual content or audio processing of the audio content or by analyzing metadata associated with the virtual content 28.

The user 18 may, for example, be able to program the event detection so that the user is alerted by the notification 510 when a particular person is present and/or a particular action occurs in the virtual content 28.

From the foregoing, it will be appreciated that the apparatus 30 can comprise:
  at least one processor 40; and
  at least one memory 46 including computer program code 48
  the at least one memory 46 and the computer program code 48 configured to, with the at
  least one processor 40, cause the apparatus 30 at least to perform:
    in response to a determination that a user is not consuming or not fully consuming virtual content, rendering to the user, a real-time notification in response to real-time virtual content consumable by the user, wherein the real-time notification directs a user to adopt a particular orientation in the real space for starting or augmenting consumption, of the real-time virtual content.

The computer program 48 may arrive at the apparatus 30 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 48. The delivery mechanism may be a signal configured to reliably transfer the computer program 48. The apparatus 30 may propagate or transmit the computer program 48 as a computer data signal.

Although the memory 46 is illustrated in FIG. 5 as a single component/circuitry it may be implemented as one or more separate components/circuitry some or all of which may be integrated/removable and/or may provide permanent/semi-permanent/dynamic/cached storage.

Although the processor 40 is illustrated in FIG. 5 as a single component/circuitry it may be implemented as one or more separate components/circuitry some or all of which may be integrated/removable. The processor 40 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The blocks illustrated in the FIGS. 11 and 15 may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

The recording of data may comprise only temporary recording, or it may comprise permanent recording or it may comprise both temporary recording and permanent recording, Temporary recording implies the recording of data temporarily. This may, for example, occur during sensing or image capture, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur. The use of the term 'capture' in relation to an image relates to temporary recording of the data of the image. The use of the term 'store' in relation to an image relates to permanent recording of the data of the image.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising
at least one processor; and
at least one memory including computer program code;
the at least one memory and the computer program code configured to, with the at least one processor, cause the apparatus at least to perform:
determining that a user is not consuming virtual content by determining the user is not using a rendering device;
identifying an event associated with at least one of the virtual content that is not consumed by the user;
determining a position in real space corresponding to the event;
in response to determining that the user is not consuming the virtual content by determining the user is not using the rendering device and further in response to identifying the event associated with the virtual content that is not consumed by the user, causing provision of a notification by a user interface of a notification device, external to the rendering device, wherein the notification provided by the notification device directs the user to start using the rendering device and to orient the rendering device toward the position in the real space; and
determining the rendering device is oriented toward the position in the real space to which the notification device directs the user to orient the rendering device, and in response thereto, causing rendering of the virtual content with which the event is associated.

2. An apparatus as claimed in claim 1, wherein the rendering device comprises at least one of a head-mounted display device, a handheld display device, or a mobile device.

3. An apparatus as claimed in claim 1, wherein the notification is a visual-only notification, or is an audio-only notification or is an audiovisual notification.

4. An apparatus as claimed in claim 1, wherein the notification is generated as an object having a particular location, in real space, that depends upon a mapping between the real space and the virtual space and at least one of a virtual orientation or a location of the virtual content in the virtual space.

5. An apparatus as claimed in claim 4, wherein the object is a sound object generated in a head-mounted audio device worn by the user, or generated by broadcasting audio from spatially distributed loudspeakers.

6. An apparatus as claimed in claim 1, wherein the virtual content represents a virtual space at a virtual orientation of a notional viewer and that part of the virtual space at the virtual orientation of the notional viewer represented by the virtual content depends upon a mapping between the real space and the virtual space and the real orientation of the head-mounted apparatus in the real space, further comprising changing the mapping before rendering the notification.

7. An apparatus as claimed in claim 1, wherein an audio notification directs the user to adopt the particular orientation or particular orientation of the rendering device when using a head-mounted display device of the rendering device.

8. An apparatus as claimed in claim 1, wherein the notification device comprises a spatially distributed device.

9. An apparatus as claimed in claim 8, wherein the virtual content would be consumable in an instance in which the rendering device is oriented towards a position in the real space at which the notification is perceived to be presented.

10. A method comprising:
    determining that a user is not consuming virtual content by determining the user is not using a rendering device;
    identifying an event associated with at least one of the virtual content that is not consumed by the user;
    determining a position in real space corresponding to the event;
    in response to determining that the user is not consuming the virtual content by determining the user is not using the rendering device and further in response to identifying the event associated with the virtual content that is not consumed by the user, causing provision of a notification by a user interface of a notification device, external to the rendering device, wherein the notification provided by the notification device directs the user to start using the rendering device and to orient the rendering device toward the position in the real space; and
    determining the rendering device is oriented toward the position in the real space to which the notification device directs the user to orient the rendering device, and in response thereto, causing rendering of the virtual content with which the event is associated.

11. A method as claimed in claim 10, wherein the rendering device comprises at least one of a head-mounted display device, a handheld display device, or a mobile device.

12. A non-transitory computer readable medium comprising program instructions stored thereon for performing at least the following:
    determining that a user is not consuming virtual content by determining the user is not using a rendering device;
    identifying an event associated with at least one of the virtual content that is not consumed by the user;
    determining a position in real space corresponding to the event;
    in response to determining that the user is not consuming the virtual content by determining the user is not using the rendering device and further in response to identifying the event associated with the virtual content that is not consumed by the user, causing provision of a notification by a user interface of a notification device, external to the rendering device, wherein the notification provided by the notification device directs the user to start using the rendering device and to orient the rendering device toward the position in the real space; and
    determining the rendering device is oriented toward the position in the real space to which the notification device directs the user to orient the rendering device, and in response thereto, causing rendering of the virtual content with which the event is associated.

* * * * *